US010616692B1

(12) United States Patent
Khaleghimeybodi (10) Patent No.: US 10,616,692 B1
(45) Date of Patent: Apr. 7, 2020

(54) OPTICAL MICROPHONE FOR EYEWEAR DEVICES

(71) Applicant: Facebook Technologies, LLC, Menlo Park, CA (US)

(72) Inventor: Morteza Khaleghimeybodi, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/192,441

(22) Filed: Nov. 15, 2018

(51) Int. Cl.
*H04R 29/00* (2006.01)
*H04R 23/00* (2006.01)

(52) U.S. Cl.
CPC ......... *H04R 23/008* (2013.01); *H04R 29/004* (2013.01)

(58) Field of Classification Search
CPC .... H04R 23/008; H04R 29/00; H04R 29/004; H04R 29/005; H04R 29/0065; H04R 1/10; H04R 5/00; H04R 5/033; H04R 25/00; H04R 25/30; H04R 25/305; H04R 25/70; H04R 29/001; H04R 29/002; H04R 29/003; H04R 29/006; H04R 29/007; H04R 29/008; H04R 25/60; H04R 25/603; H04R 25/607; H04R 25/609; H04R 25/65; H04R 25/652; H04R 25/654; H04R 25/656; H04R 25/658; H04R 25/659; H04R 2225/57; H04S 1/005; G02C 5/143; G02C 11/06; G06F 3/16; G06F 3/162; G06F 3/165; G06F 3/167; G06F 16/60; G06F 16/61;
(Continued)

(56) References Cited

U.S. PATENT DOCUMENTS

2009/0097681 A1* 4/2009 Puria ............... H04R 25/405
381/318
2011/0091057 A1 4/2011 Derkx
(Continued)

FOREIGN PATENT DOCUMENTS

KR 10-2017-0009658 A 1/2017

OTHER PUBLICATIONS

Layton et al "Optical fiber acoustic sensor utilizing mode-mode interference", Applied Optics, vol. 18, No. 5, March, p. 41, IDS (Year: 1979).*

(Continued)

*Primary Examiner* — Leshui Zhang
(74) *Attorney, Agent, or Firm* — Fenwick & West LLP (57) ABSTRACT

An audio system includes a transducer assembly, an optical sensing pathway, a laser, a detector assembly, and a controller. The transducer assembly is coupled to a user's ear and produces an acoustic pressure wave based on an audio instruction. The optical sensing pathway moves, at least in part, with a detected acoustic pressure wave. The laser emits light that is separated into a reference beam and a sensing beam that is coupled into the optical sensing pathway. The detected acoustic pressure wave interacts with the sensing beam to alter its optical path length. The detector assembly detects the reference and sensing beams from the optical sensing pathway, and measures the detected acoustic pressure wave based on changes in optical path length between the reference beam and the sensing beam. The controller adjusts the audio instruction based on the measurement of the detected acoustic pressure wave.

18 Claims, 5 Drawing Sheets

(58) Field of Classification Search
CPC .... G06F 16/632; G06F 16/634; G06F 16/635; G06F 16/636; G06F 16/637; G06F 16/638; G06F 16/639; G06F 16/64; H03G 3/32
USPC ......... 381/58, 60, 56, 57, 309, 311, 310, 26, 381/312, 322, 324, 326, 327, 328, 329, 381/330, 72, 73.1, 74, 75, 122, 111–115; 700/94
See application file for complete search history.

(56) References Cited

U.S. PATENT DOCUMENTS

| | | | |
|---|---|---|---|
| 2013/0096367 A1* | 4/2013 | Easter | A61F 11/045 600/25 |
| 2013/0242262 A1 | 9/2013 | Lewis | |
| 2013/0329918 A1 | 12/2013 | Kubba | |
| 2015/0319546 A1* | 11/2015 | Sprague | H04R 25/65 381/312 |
| 2017/0227793 A1 | 8/2017 | Abreu | |

OTHER PUBLICATIONS

Bilaniuk, N., "Optical Microphone Transduction Techniques," Applied Acoustics, 1997, pp. 35-63, vol. 50, No. 1.
Fischer, B., "Optical Microphone Hears Ultrasound," Nature Photonics, Jun. 2016, pp. 356-358, vol. 10.
Giallorenzi, T.G. et al., "Optical Fiber Sensor Technology," IEEE Transactions on Microwave Theory and Techniques, Apr. 1982, pp. 472-511, vol. MTT-30, No. 4.
Kadirvel, K. et al., "Design and Characterization of MEMS Optical Microphone for Aeroacoustic Measurement," Florida Univ Gainesville Dept of Electrical and Computer Engineering, 2004, 10 pages.
Layton, M.R. et al., "Optical Fiber Acoustic Sensor Utilizing Mode-Mode Interference," Applied Optics, Mar. 1, 1979, pp. 666-670, vol. 18, No. 5.
PCT International Search Report and Written Opinion, PCT Application No. PCT/US2018/061658, dated Aug. 7, 2019, 12 pages.

* cited by examiner

OPTICAL MICROPHONE FOR EYEWEAR DEVICES

BACKGROUND

This disclosure relates generally to an audio system in an eyewear device, and specifically relates to an optical microphone for use in eyewear devices.

Head-mounted displays in an artificial reality system often include features such as speakers or personal audio devices to provide audio content to users of the head-mounted displays. The audio systems in head-mounted displays can include microphones positioned at or near the entrances of a user's ears to measure the sound produced by the speakers and calibrate the audio system. Current microphones for use in head-mounted displays, such as binaural microphones or microphone arrays embedded in frames of head-mounted devices, have limited sensitivity. For example, typical microphones used in head-mounted devices have difficulty detecting audio pressure waves produced by bone conduction transducers, which generate particle displacements outside the ear in the nanometer or picometer range. To generate pressure waves that can be detected by existing microphones, bone conduction transducers must produce a very loud volume, which is unpleasant for the user.

SUMMARY

This present disclosure describes an audio system that includes an optical microphone for detecting audio waves with a higher sensitivity than previous microphones. The audio system may be a component of an eyewear device that is a component of an artificial reality head-mounted display (HMD). The audio system includes at least one transducer that produces acoustic pressure waves, and an optical microphone to detect the acoustic pressure waves. The optical microphone can be positioned at the entrance to the user's ear canal or in the vicinity of the user's ear. The optical microphone includes a laser that emits light that is separated into a sensing beam and a reference beam, e.g., using a beam splitter. The sensing beam travels through an optical sensing pathway, such as an optical fiber. The acoustic wave interacts with the sensing beam while it is in the optical sensing pathway by altering the optical path length of the sensing beam. A detector assembly receives the sensing beam from the optical sensing pathway, and also receives the reference beam. The detector measures the detected acoustic pressure wave based on the change in optical path length of the sensing beam. The audio system may adjust the acoustic pressure waves produced by the transducer based on the measurement of the detected acoustic pressure wave.

In some embodiments, an audio system is described herein. The audio system includes a transducer assembly, an optical sensing pathway, a laser, a detector assembly, and a controller. The transducer assembly configured to be coupled to an ear of a user and to produce an acoustic pressure wave based on an audio instruction. The optical sensing pathway is configured to move, at least in part, with a detected acoustic pressure wave. The laser is configured to emit light that is separated into a reference beam and a sensing beam. The sensing beam is coupled into the optical sensing pathway, and the detected acoustic pressure wave interacts with the sensing beam in the optical sensing pathway to alter an optical path length of the sensing beam. The detector assembly is configured to detect the reference beam and detect the sensing beam from the optical sensing pathway, and measure the detected acoustic pressure wave based in part on changes in optical path length between the reference beam and the sensing beam. The controller is configured to adjust the audio instruction based on the measurement of the detected acoustic pressure wave.

Embodiments according to the invention are in particular disclosed in the attached claims directed to an audio system and an eyewear device, wherein any feature mentioned in one claim category, e.g. audio system, can be claimed in another claim category, e.g. eyewear device, system, method, storage medium, or computer program product, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic sensation, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including an eyewear device, a head-mounted display (HMD) assembly with the eyewear device as a component, a HMD connected to a host computer system, a standalone HMD, a mobile device or computing system, or any other hardware platform capable of providing artificial reality content to one or more viewers.

System Architecture

An audio system includes an optical microphone for measuring sound provided to an ear of a user. The audio system comprises one or more transducers, such as cartilage conduction transducers, air conduction transducers, or bone conduction transducers. The transducers produce acoustic pressure waves sensed by a user's ear. Because ear shape and configuration varies between users, transducers produce acoustic pressure waves that vary from user to user. The acoustic pressure waves may be airborne pressure waves or tissue borne pressure waves (e.g., an acoustic pressure wave that propagates through bone, cartilage, or one or more other tissues), depending on the transducer used. For example, a cartilage conduction transducer vibrates an auricle of the user's ear, which creates an airborne acoustic pressure wave at an entrance of the ear that travels down an ear canal to an eardrum where it is perceived as sound by the user. In response to a given vibration of a cartilage conduction transducer, different ear geometries produce different airborne acoustic pressure waves. The optical microphone measures the acoustic pressure waves generated by the transducers, and provides the measurement to a controller that adjusts audio instructions to the transducers according to the measurement.

The optical microphone disclosed herein includes an optical sensing pathway that moves with a detected acoustic pressure wave. The movement of the optical sensing pathway alters an optical path length of a sensing beam that travels through the optical sensing pathway. Measuring the change in optical path length provides a measurement of the detected acoustic pressure wave. The optical microphone configuration described herein is highly sensitive. For example, the optical microphone can detect particle deflections in the nanometer or picometer range, which enables measurement of airborne pressure waves generated by a bone conduction transducer at the outside of a user's ear, even at a low volumes. Thus, the optical microphone can be used to calibrate the audio instructions to the transducers without the need for unpleasant, high-volume sounds.

Figure 1:
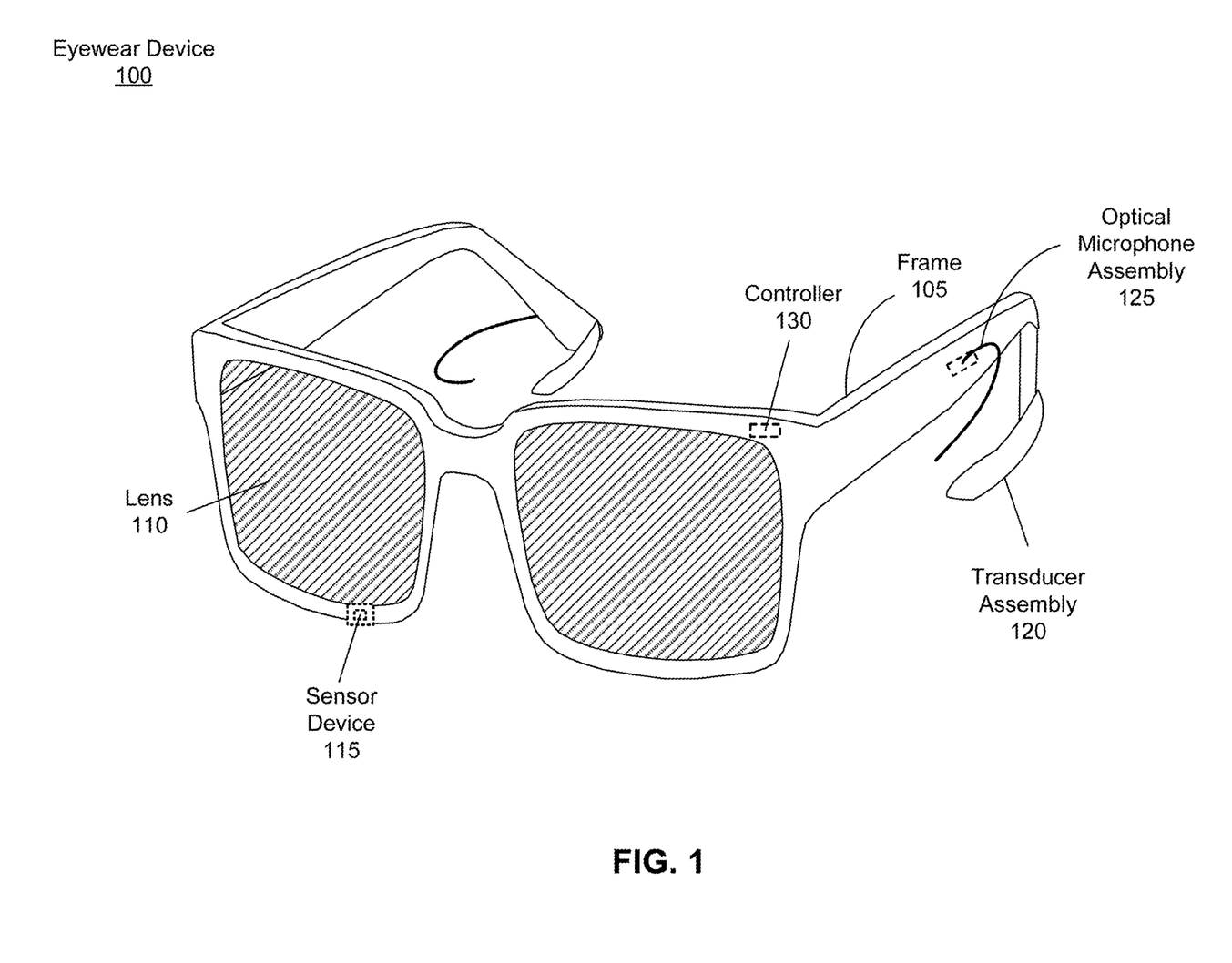
FIG. 1 is a perspective view of an eyewear device including an audio system, in accordance with one or more embodiments.

FIG. 1 is a perspective view of an eyewear device 100 including an audio system, in accordance with one or more embodiments. The eyewear device 100 presents media to a user. In one embodiment, the eyewear device 100 may be a component of a head-mounted display (HMD). In some embodiments, the eyewear device 100 is a near-eye display. Examples of media presented by the eyewear device 100 include one or more images, video, audio, or some combination thereof. The eyewear device 100 may include, among other components, a frame 105, a lens 110, a sensor device 115, a transducer assembly 120, an optical microphone assembly 125, and a controller 150.

The eyewear device 100 may correct or enhance the vision of a user, protect the eye of a user, or provide images to a user. The eyewear device 100 may be eyeglasses which correct for defects in a user's eyesight. The eyewear device 100 may be sunglasses which protect a user's eye from the sun. The eyewear device 100 may be safety glasses which protect a user's eye from impact. The eyewear device 100 may be a night vision device or infrared goggles to enhance a user's vision at night. The eyewear device 100 may be a HMD that produces artificial reality content for the user. Alternatively, the eyewear device 100 may not include a lens 110 and may be a frame 105 with an audio system that provides audio (e.g., music, radio, podcasts) to a user.

The frame 105 includes a front part that holds the lens 110 and end pieces to attach to the user. The front part of the frame 105 bridges the top of a nose of the user. The end pieces (e.g., temples) are portions of the frame 105 to which the temples of a user are attached. The length of the end piece may be adjustable (e.g., adjustable temple length) to fit different users. The end piece may also include a portion that curls behind the ear of the user (e.g., temple tip, ear piece).

The lens 110 provides or transmits light to a user wearing the eyewear device 100. The lens 110 is held by a front part of the frame 105 of the eyewear device 100. The lens 110 may be prescription lens (e.g., single vision, bifocal and trifocal, or progressive) to help correct for defects in a user's eyesight. The prescription lens transmits ambient light to the user wearing the eyewear device 100. The transmitted ambient light may be altered by the prescription lens to correct for defects in the user's eyesight. The lens 110 may be a polarized lens or a tinted lens to protect the user's eyes from the sun. The lens 110 may be one or more waveguides as part of a waveguide display in which image light is coupled through an end or edge of the waveguide to the eye of the user. The lens 110 may include an electronic display for providing image light and may also include an optics block for magnifying image light from the electronic display. Additional detail regarding the lens 110 can be found in the detailed description of FIG. 5.

The sensor device 115 estimates a current position of the eyewear device 100 relative to an initial position of the eyewear device 100. The sensor device 115 may be located on a portion of the frame 105 of the eyewear device 100. In other embodiments, the sensor device 115 may be located in a different location from the location shown in FIG. 1. The sensor device 115 includes a position sensor and an inertial measurement unit. Additional details about the sensor device 115 can be found in the detailed description of FIG. 5.

The audio system of the eyewear device 100 comprises a transducer assembly 120 configured to provide audio content to a user of the eyewear device 100 and an optical microphone assembly 125 configured to detect acoustic pressure waves produced by the transducer assembly 120. In the illustrated embodiment of FIG. 1, the audio system of the eyewear device 100 includes the transducer assembly 120, the optical microphone assembly 125, and the controller 130. The audio system provides audio content to a user by utilizing the transducer assembly 120. The audio system also uses feedback from the optical microphone assembly 125 to create a similar audio experience across different users. The controller 130 manages operation of the transducer assembly 120 by generating audio instructions. The controller 130 also receives feedback as monitored by the microphone assembly 120, e.g., for updating the audio instructions. Additional detail regarding the audio system can be found in the detailed description of FIG. 3.

Various types of transducers are available for outputting audio content to a user's ear. The transducer assembly 120 can include a single type of transducer, such as a cartilage conduction transducer, a bone conduction transducer, or an air conduction transducer. Alternatively, the transducer assembly 120 is a hybrid transducer that includes two or more types of transducers. For example, the transducer assembly 120 includes two transducers configured to vibrate over two different frequency ranges, which may or may not overlap. The transducer assembly 120 operates according to audio instructions, which may include a content signal, a control signal, and a gain signal. The content signal may be based on audio content for presentation to the user. The control signal may be used to enable or disable the transducer assembly 120 or one or more transducers of the transducer assembly. The gain signal may be used to adjust an amplitude of the content signal.

In some embodiments, the transducer assembly 120 includes a cartilage conduction transducer that produces sound by vibrating cartilage in the ear of the user. In an embodiment, a cartilage conduction transducer is coupled to an end piece of the frame 105 and is configured to be coupled to the back of an auricle of the ear of the user. The auricle is a portion of the outer ear that projects out of a head of the user. The cartilage conduction transducer receives audio instructions from the controller 130 and vibrates the auricle to generate an airborne acoustic pressure wave at an entrance of the user's ear according to the audio instructions.

In some embodiments, the transducer assembly 120 includes an air conduction transducer that produces sound by generating an airborne acoustic pressure wave in the ear of the user. In an embodiment, the air conduction transducer is coupled to an end piece of the frame 105 and is placed in front of an entrance to the ear of the user. The air conduction transducer receives audio instructions from the controller 130.

In some embodiments, the transducer assembly 120 includes a bone conduction transducer that produces sound by vibrating bone in the user's head. In an embodiment, the bone conduction transducer is coupled to an end piece of the frame 105 and is configured to be behind the auricle and coupled to a portion of the user's bone. The bone conduction transducer receives audio instructions from the controller 130 and vibrates the portion of the user's bone according to the audio instructions. The bone vibration generates a tissue borne acoustic pressure wave that propagates toward the user's cochlea, thereby bypassing the eardrum.

The optical microphone assembly 125 detects an acoustic pressure wave at the entrance of the ear of the user. The optical microphone assembly 125 is coupled to an end piece of the frame 105. The optical microphone assembly 125, as shown in FIG. 1, includes an optical sensing pathway, such as an optical fiber, that is positioned at the entrance of the user's ear. The optical microphone assembly 125 also includes a laser and a detector assembly, which are coupled to or housed in the frame 105. For example, the laser and/or detector assembly may be housed in the frame 105 at or near the controller 130, or housed in the end piece of the frame 105 to which the optical sensing pathway is coupled. The laser is configured to emit light into the optical sensing pathway, and the detector assembly is configured to detect light that has traveled through the optical sensing pathway. The detector measures the acoustic pressure wave in the vicinity of the user's ear based on an optical path length of the detected light.

In the embodiment shown in FIG. 1, the optical fiber is configured so that the optical microphone assembly 125 directly measures an acoustic pressure wave at the entrance of the ear of the user. In other embodiments, the optical fiber is located in a different location in the vicinity of the user's ear. In still other embodiments, the optical microphone assembly 125 includes an optical fiber coupled to a flexible membrane that is configured to be coupled to the back of the auricle of the user, and the optical microphone assembly 125 indirectly measures the acoustic pressure wave at the entrance of the ear. For example, the optical microphone assembly 125 may measure a vibration that is a reflection of the acoustic pressure wave at the entrance of the ear and/or measure a vibration created by the transducer assembly 120 on the auricle of the ear of the user, which may be used to estimate the acoustic pressure wave at the entrance of the ear. In other embodiments, the flexible membrane with the optical fiber is coupled to a bone in the user's head or other tissue. Additional detail regarding the optical microphone assembly 125 can be found in the detailed description of FIG. 3.

The controller 130 provides audio instructions to the transducer assembly 120 and receives information from the optical microphone assembly 125 regarding the produced sound, and updates the audio instructions based on the received information. The audio instructions may be generated by the controller 130. The controller 130 may receive audio content (e.g., music, calibration signal) from a console for presentation to a user and generate audio instructions based on the received audio content. Audio instructions instruct the transducer assembly 120 or each transducer of the transducer assembly 120 how to produce vibrations. For example, audio instructions may include a content signal (e.g., a target waveform based on the audio content to be provided), a control signal (e.g., to enable or disable the transducer assembly), and a gain signal (e.g., to scale the content signal by increasing or decreasing an amplitude of the target waveform). If multiple transducers are included in the transducer assembly 120, the controller 130 tailors different audio instructions for different transducers. For example, an acoustic pressure wave generated by a bone conduction transducer generally has a smaller magnitude than the acoustic pressure waves generated by cartilage or air conduction transducers. In addition, the frequency responses of different transducers may be different, so the controller 130 adjusts the instructions for each transducer based on their frequency responses.

The controller 130 also receives information from the optical microphone assembly 125 that describes the produced sound at an ear of the user. The controller 130 uses the received information as feedback to compare to the produced sound to a target sound (e.g., audio content) and updates the audio instructions to make the produced sound closer to the target sound. For example, the controller 130 updates audio instructions for a cartilage conduction transducer assembly to adjust vibration of the auricle of the user's ear to come closer to the target sound. The controller 130 is embedded into the frame 105 of the eyewear device 100. In other embodiments, the controller 130 may be located in a different location. For example, the controller 130 may be part of the transducer assembly 120 or the optical microphone assembly 125, or located external to the eyewear device 100. Additional detail regarding the controller 130 and the controller's 130 operation with other components of the audio system can be found in the detailed description of FIGS. 3 & 4.

Audio System

Figure 2A:
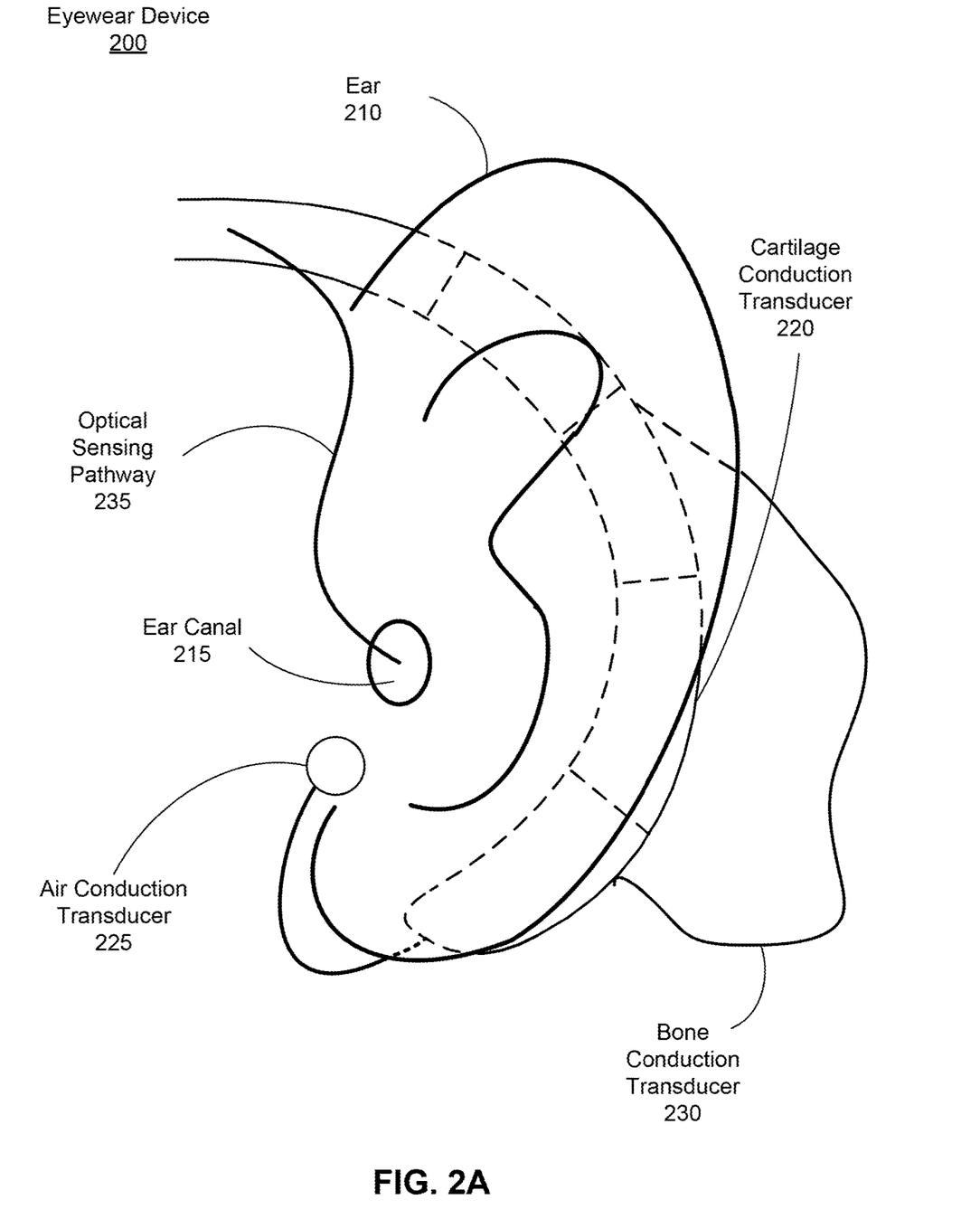
FIG. 2A is a profile view a portion of an audio system including an optical fiber microphone as a component of an eyewear device, in accordance with one or more embodiments.

FIG. 2A is a profile view 200 of a portion of an audio system including an optical fiber microphone as a component of an eyewear device (e.g., the eyewear device 100), in accordance with one or more embodiments. In this embodiment, the transducer assembly 120 includes a cartilage conduction transducer 220, an air conduction transducer 225, and a bone conduction transducer 230. The optical sensing pathway 235 is a component of the optical microphone assembly 125. The optical sensing pathway 235 detects audio pressure waves produced by one or more of the cartilage conduction transducer 220, the air conduction transducer 225, or the bone conduction transducer 230.

In the embodiment shown in FIG. 2A, the optical sensing pathway 235 is an optical fiber through which light travels to detect acoustic pressure near the entrance to an ear 210 of the user. The light traveling through the optical fiber may be a sensing beam that is transmitted by a laser housed in the frame 105. The sensing beam travels through the optical fiber in a direction away from the frame 105. The sensing beam is reflected at the end of the optical fiber and travels back through the optical fiber towards a detector, which is also be housed in the frame 105. For example, the optical sensing pathway 235 may include a Fabry-Perot interferometer at the end near the entrance to the ear 210. The Fabry-Perot interferometer includes a half mirror and a full mirror pointed towards each other, so that the sensing beam passes back and forth between these two mirrors. The mirrors may be separated by air or another medium. The acoustic pressure waves modulate the sensing beam as is passes between the two mirrors. In other embodiments, other types of interferometer configurations may be used. In some embodiments, light travels in a single direction through the optical fiber, and the optical sensing pathway 235 includes both a forward and return pathway (i.e., the optical sensing pathway 235 forms a loop). An acoustic pressure wave generated, either directly or indirectly, by one or more of the transducers 220, 225, or 230 interacts with the sensing beam as the sensing beam travels through the optical fiber (e.g., within the Fabry-Perot interferometer at the end of the optical fiber) such that the acoustic pressure wave alters an optical path length of the sensing beam. The optical microphone assembly 125 determines the optical path length of the sensing beam that traveled through the optical fiber, and measures the acoustic pressure wave based on the detected optical path length of the sensing beam. The components of the optical microphone assembly 125 are described in greater detail with respect to FIG. 4.

As depicted in FIG. 2A, the optical sensing pathway 235 is an optical fiber that is suspended from the frame 105, which is a housing of the audio system. In this case, the optical sensing pathway 235 extends directly from the frame 105 towards the entrance of the ear 210. The optical sensing pathway 235 measures airborne acoustic waves produced by the transducers 220, 225, or 230. For example, the optical sensing pathway 235 measures an airborne pressure wave directly produced by the air conduction transducer 225 and conducted through the air in the vicinity of the ear 210. The optical sensing pathway 235 measures an airborne pressure wave indirectly produced by the cartilage conduction transducer 220 or the bone conduction transducer 230, i.e., an airborne pressure wave that is produced from a tissue borne pressure wave. The length of the optical fiber may be either longer or shorter than it is depicted in FIG. 2A. A longer optical fiber may increase sensitivity of the optical microphone, while a shorter optical fiber may be less distracting to a user. In some embodiments, the optical sensing pathway 235 includes a rigid component extending from the frame 105 and a flexible optical fiber extending from the rigid component and positioned near the entrance of the ear 210. In an embodiment, the optical sensing pathway 235 suspended from the housing of the audio system is configured to be coupled to tissue of the user.

The cartilage conduction transducer 220 is coupled to a portion of the back of an auricle of an ear 210 of a user. The cartilage conduction transducer 220 vibrates the back of auricle of the ear 210 of a user at first range of frequencies to generate a first range of airborne acoustic pressure waves at an entrance of the ear 210 based on audio instructions (e.g., from the controller). The air conduction transducer 225 is a speaker (e.g., a voice coil transducer) that vibrates over a second range of frequencies to generate a second range of airborne acoustic pressure waves at the entrance of the ear. The first and second ranges of frequencies may be different or may have some overlap. The first range of airborne acoustic pressure waves and the second range of airborne acoustic pressure waves travel from the entrance of the ear 210 down an ear canal 215 where an eardrum is located. The eardrum vibrates due to fluctuations of the airborne acoustic pressure waves which are then detected as sound by a cochlea of the user (not shown in FIG. 2). The optical sensing pathway 235 and other components of the optical microphone assembly 125 are positioned at the entrance of the ear 210 of the user to detect the acoustic pressure waves produced by the cartilage conduction transducer 220 and the air conduction transducer 225.

The bone conduction transducer 230 is coupled to a portion of the user's bone behind the user's ear 210. The bone conduction transducer 230 vibrates over a third range of frequencies. The bone conduction transducer 230 vibrates the portion of the bone to which it is coupled. The portion of the bone conducts the vibrations to create a third range of tissue borne acoustic pressure waves at the cochlea which is then perceived by the user as sound. The vibration within the inner ear created by the bone conduction transducer 230 results in a weak airborne acoustic pressure wave outside the user's ear. The optical sensing pathway 235 and other components of the optical microphone assembly 125 are configured to detect the airborne acoustic pressure waves produced by the bone conduction transducer 230.

More particularly, the bone conduction transducer 230 generates tissue borne pressure waves that travel through the user's bone (e.g., the mastoid) to the inner ear, which contains the cochlea. When the tissue borne pressure waves reach the inner ear, the waves within the inner ear vibrate the ear drum from the inside, which generates weak airborne pressure waves on the outside of the user's ear drum. For example, the airborne pressure waves outside the user's ear may result in particle displacements on the order of nanometers or picometers. These airborne pressure waves are too weak to be detected by typical binaural microphones or microphone arrays. However, the optical sensing pathway 235 is sensitive enough to detect particle displacements on the order of nanometers or picometers, and therefore can detect acoustic pressure waves generated by the bone conduction transducer 230.

Although the portion of the audio system, as shown in FIG. 2A, illustrates one cartilage conduction transducer 220, one air conduction transducer 225, one bone conduction transducer 230, and one optical sensing pathway 235 configured to produce and detect audio content for one ear 210 of the user, other embodiments include an identical setup to produce audio content for the other ear of the user. Other embodiments of the audio system comprise any combination of one or more cartilage conduction transducers, one or more air conduction transducers, and one or more bone conduction transducers. Examples of the audio system include a combination of cartilage conduction and bone conduction, another combination of air conduction and bone conduction, another combination of air conduction and cartilage conduction, etc.

Figure 2B:
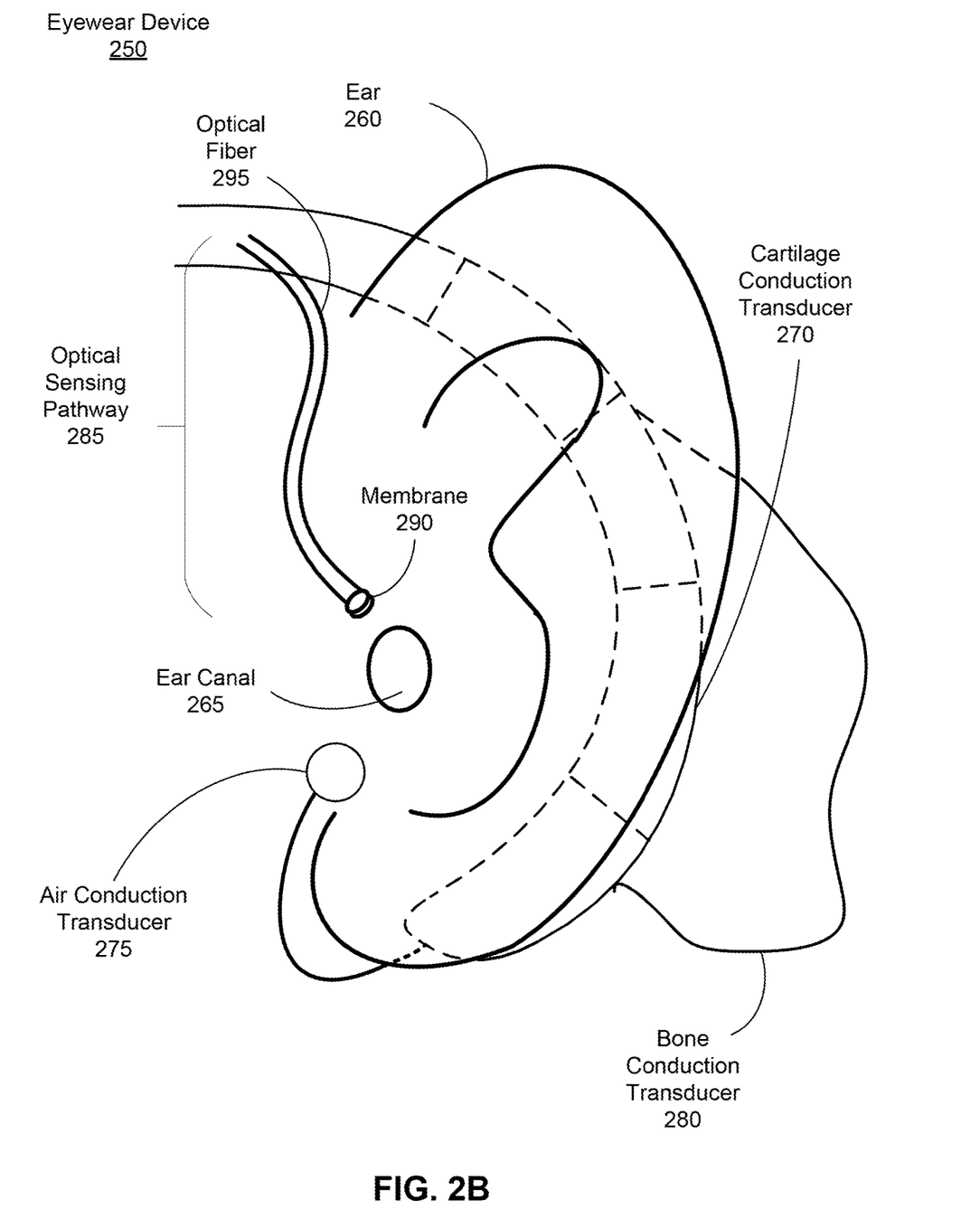
FIG. 2B is a profile view a portion of an audio system including an optical microphone with a flexible membrane as a component of an eyewear device, in accordance with one or more embodiments.

FIG. 2B is a profile view 250 of a portion of an audio system including an optical microphone with a flexible membrane as a component of an eyewear device (e.g., the eyewear device 100), in accordance with one or more embodiments. The transducer assembly 120 includes a cartilage conduction transducer 270, an air conduction transducer 275, and a bone conduction transducer 280, which are similar to the cartilage conduction transducer 220, air conduction transducer 225, and bone conduction transducer 230 described with respect to FIG. 2A. The optical sensing pathway 285 is a component of an alternative embodiment of the optical microphone assembly 125. The optical sensing pathway 285 detects airborne audio pressure waves produced by one or more of the cartilage conduction transducer 270, the air conduction transducer 275, or the bone conduction transducer 280.

In the embodiment shown in FIG. 2B, the optical sensing pathway 285 is an optical fiber 295 to which a membrane 290 is coupled. The membrane 290 is flexible, and the optical fiber 295 is attached to the membrane 290 in such a way that when the membrane 290 moves (e.g., in response to an acoustic pressure wave), the length of the optical sensing pathway 285 changes. The optical fiber 295 may be rigid, so that the changes in optical path length are generated by movement of the membrane 290, rather than movement of the optical fiber 295. The membrane 290 and optical fiber 295 are connected to the frame 105 and positioned in the vicinity of the ear canal 265. As with the optical fiber in FIG. 2A, a sensing beam emitted by a laser housed in the frame 105 travels into and through the optical fiber 295. The sensing beam is reflected by the membrane 290 and travels back through the optical fiber 295 towards a detector. The sensing beam output by the optical fiber 295 is directed towards the detector.

An acoustic pressure wave generated by one or more of the transducers 270, 275, or 280 interacts with the sensing beam as the sensing beam travels through the optical fiber such that the acoustic pressure wave alters an optical path length of the sensing beam. In particular, the membrane 290 moves with the detected acoustic pressure wave, and the movement of the membrane 290 causes a change in the optical path length of the optical fiber 295. For example, when the acoustic pressure wave pushes the membrane 290 in the direction of the frame 105, this shortens the optical path length compared to a neutral position of the membrane position 290. The optical microphone assembly 125 determines the optical path length of the sensing beam that traveled through the optical fiber 295, and measures the acoustic pressure wave based on the detected optical path length of the sensing beam. For example, the membrane 290 may vibrate with an acoustic pressure wave, and a detected amplitude of the vibrations, as measured by an amount of variation of the optical path length, may be correlated to an amplitude of the detected acoustic pressure wave. The coupled optical fiber 295 is sensitive to acoustic pressure waves on the order of nanometers or even picometers, allowing the detection at low volumes and detection of pressure waves generated by the bone conduction transducer 280.

While in FIG. 2B the membrane 290 of the optical sensing pathway 285 is positioned near the entrance to the ear 260, in other embodiments, the optical sensing pathway 285 and/or membrane 290 is located at a different position. For example, the optical fiber 295 and attached membrane 290 may be mounted directly on the frame 105, rather than the optical fiber 295 extending from the frame 105 towards the entrance of the user's ear as shown in FIG. 2B. In other embodiments, the membrane 290 and coupled optical fiber 295 are coupled to tissue of a user's head. For example, the membrane 290 is coupled to the auricle of the ear 260 or to a bone in the user's head. Coupling the membrane 290 to a bone in the user's head may further improve detection of acoustic pressure waves generated by the bone conduction transducer 280. In this example, the membrane 290 measures a tissue borne pressure wave, rather than an airborne pressure wave resulting from a tissue borne pressure wave. In some embodiments, the audio system includes multiple optical sensing pathways, e.g., one optical sensing pathway near the ear canal for detecting airborne acoustic pressure waves, and a second optical sensing pathways coupled to tissue for detecting tissue borne acoustic pressure waves.

As shown in FIG. 2B, the optical sensing pathway 285 has an optical fiber 295 that is suspended from the housing of the audio system (e.g., the frame 105). In one embodiment, the optical sensing pathway 285 (e.g., the membrane 290) is configured to be coupled to tissue of the user. In another embodiment, an end of the optical sensing pathway 285 (e.g., the membrane 290) is configured to be suspended in air and positioned at an entrance to the ear of the user (e.g., the entrance to the ear canal 265, as shown in FIG. 2B).

Figure 3:
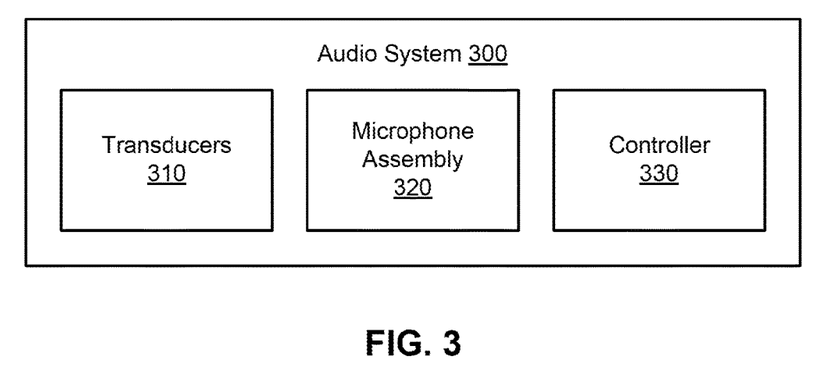
FIG. 3 is a block diagram of an audio system, in accordance with one or more embodiments.

FIG. 3 is a block diagram of an audio system 300, in accordance with one or more embodiments. The audio system in FIG. 1 is an embodiment of the audio system 300. The audio system 300 includes one or more transducers 310, an acoustic assembly 320, and a controller 330. In one embodiment, the audio system 300 further comprises an input interface. In other embodiments, the audio system 300 can have any combination of the components listed with any additional components. Similarly, the functions can be distributed among the components in a different manner than is described here.

The transducers 310 comprise any combination of one or more cartilage conduction transducers, one or more air conduction transducers, and one or more bone conduction transducers, in accordance with one or more embodiments. The transducers 310 provide sound to a user over a total range of frequencies. For example, the total range of frequencies is 20 Hz-20 kHz, generally around the average range of human hearing. Each of the transducers 310 is configured to vibrate over various ranges of frequencies. In one embodiment, each of the transducers 310 operates over the total range of frequencies. In other embodiments, each transducer operates over a subrange of the total range of frequencies. In one embodiment, one or more transducers operate over a first subrange and one or more transducers operate over a second subrange. For example, a first transducer is configured to operate over a low subrange (e.g., 20 Hz-500 Hz) while a second transducer is configured to operate over a medium subrange (e.g., 500 Hz-8 kHz) and a third transducer is configured to operate over a high subrange (e.g., 8 kHz-20 kHz). In another embodiment, subranges for the transducers 310 partially overlap with one or more other subranges.

In some embodiments, the transducers 310 include a cartilage conduction transducer. A cartilage conduction transducer is configured to vibrate a cartilage of a user's ear in accordance with audio instructions (e.g., received from the controller 330). The cartilage conduction transducer is coupled to a portion of a back of an auricle of an ear of a user. The cartilage conduction transducer includes at least one transducer to vibrate the auricle over a first frequency range to cause the auricle to create an acoustic pressure wave in accordance with the audio instructions. Over the first frequency range, the cartilage conduction transducer can vary amplitude of vibration to affect amplitude of acoustic pressure waves produced. For example, the cartilage conduction transducer is configured to vibrate the auricle over a first frequency subrange of 500 Hz-8 kHz. In one embodiment, the cartilage conduction transducer maintains good surface contact with the back of the user's ear and maintains a steady amount of application force (e.g., 1 Newton) to the user's ear. Good surface contact provides maximal translation of vibrations from the transducers to the user's cartilage.

In one embodiment, a transducer is a single piezoelectric transducer. A piezoelectric transducer can generate frequencies up to 20 kHz using a range of voltages around +/−100V. The range of voltages may include lower voltages as well (e.g., +/−10V). The piezoelectric transducer may be a stacked piezoelectric actuator. The stacked piezoelectric actuator includes multiple piezoelectric elements that are stacked (e.g. mechanically connected in series). The stacked piezoelectric actuator may have a lower range of voltages because the movement of a stacked piezoelectric actuator can be a product of the movement of a single piezoelectric element with the number of elements in the stack. A piezoelectric transducer is made of a piezoelectric material that can generate a strain (e.g., deformation in the material) in the presence of an electric field. The piezoelectric material may be a polymer (e.g., polyvinyl chloride (PVC), polyvinylidene fluoroide (PVDF)), a polymer-based composite, ceramic, or crystal (e.g., quartz (silicon dioxide or $SiO_2$), lead zirconate-titanate (PZT)). By applying an electric field or a voltage across a polymer which is a polarized material, the polymer changes in polarization and may compress or expand depending on the polarity and magnitude of the applied electric field. The piezoelectric transducer may be coupled to a material (e.g., silicone) that attaches well to an ear of a user.

In another embodiment, a transducer is a moving coil transducer. A typical moving coil transducer includes a coil of wire and a permanent magnet to produce a permanent magnetic field. Applying a current to the wire while it is placed in the permanent magnetic field produces a force on the coil based on the amplitude and the polarity of the current that can move the coil towards or away from the permanent magnet. The moving coil transducer may be made of a more rigid material. The moving coil transducer may also be coupled to a material (e.g., silicone) that attaches well to an ear of a user.

In some embodiments, the transducers 310 include an air conduction transducer. An air conduction transducer is configured to vibrate to generate acoustic pressure waves at an entrance of the user's ear in accordance with audio instructions (e.g., received from the controller 330). The air conduction transducer is in front of an entrance of the user's ear. Optimally, the air conduction transducer is unobstructed, being able to generate acoustic pressure waves directly at the entrance of the ear. The air conduction transducer includes at least one transducer (substantially similar to the transducer described in conjunction with the cartilage conduction transducer) to vibrate over a second frequency range to create an acoustic pressure wave in accordance with the audio instructions. Over the second frequency range, the air conduction transducer can vary amplitude of vibration to affect amplitude of acoustic pressure waves produced. For example, the air conduction transducer is configured to vibrate over a second frequency subrange of 8 kHz-20 kHz (or a higher frequency that is hearable by humans).

In some embodiments, the transducers 310 include a bone conduction transducer. A bone conduction transducer is configured to vibrate the user's bone to be detected directly by the cochlea in accordance with audio instructions (e.g., received from the controller 330). The bone conduction transducer may be coupled to a portion of the user's bone. In one implementation, the bone conduction transducer is coupled to the user's skull behind the user's ear. In another implementation, the bone conduction transducer is coupled to the user's jaw. The bone conduction transducer includes at least one transducer (substantially similar to the transducer described in conjunction with the cartilage conduction transducer) to vibrate over a third frequency range in accordance with the audio instructions. Over the third frequency range, the bone conduction transducer can vary amplitude of vibration. For example, the bone conduction transducer assembly is configured to vibrate over a third frequency subrange of 100 Hz (or a lower frequency that is hearable by humans)-500 Hz.

The microphone assembly 320 detects acoustic pressure waves at the entrance of the user's ear. The microphone assembly 320 is an optical microphone that includes an optical sensing pathway, such as one of the optical sensing pathways described with respect to FIGS. 2A and 2B. One or more optical microphones may be positioned at an entrance of each ear of a user. The microphone assembly 320 is configured to detect the airborne acoustic pressure waves formed at an entrance of the user's ears. Alternatively or additionally, the microphone assembly 320 is configured to detect the airborne acoustic pressure waves formed at an entrance of the user's ears. In one embodiment, the microphone assembly 320 provides information regarding the produced sound to the controller 330. The microphone assembly 320 transmits feedback information of the detected acoustic pressure waves to the controller 330. An example of the microphone assembly 320 is described in greater detail with respect to FIG. 4.

The controller 330 controls components of the audio system 300. The controller 330 generates audio instructions to instruct the transducers 310 how to produce vibrations based on feedback from the microphone assembly 320. For example, audio instructions may include a content signal (e.g., signal applied to any one of the transducers 310 to produce a vibration), a control signal to enable or disable any of the transducers 310, and a gain signal to scale the content signal (e.g., increase or decrease amplitude of vibrations produced by any of the transducers 310). For example, the controller 330 subdivides the audio instructions into different sets of audio instructions for different transducers 310. A set of audio instructions controls a specific transducer. In some embodiments, the controller 330 subdivides the audio instructions for each transducer based on a frequency range for each transducer, based on a received selection of an audio source option from the user (e.g., via an input interface), or based on both the frequency range of each transducer and the received selection of an audio source option.

For example, the audio system 300 may comprise a cartilage conduction transducer, an air conduction transducer, and a bone conduction transducer. Following this example, the controller 330 may designate a first set of audio instructions for dictating vibration over a medium range of frequencies for the cartilage conduction transducer, a second set of audio instructions for dictating vibration over a high range of frequencies for the air conduction transducer, and a third set of audio instructions for dictating vibration over a low range of frequencies for the bone conduction transducer. In additional embodiments, the sets of audio instructions instruct the transducers 310 such that a frequency range of one transducer partially overlaps a frequency range of another transducer.

The controller 330 generates the content signal of the audio instructions based on portions of audio content and a frequency response model. The audio content to be provided may include sounds over the entire range of human hearing. The controller 330 takes the audio content and determines portions of the audio content to be provided by each of the transducers 310. In one embodiment, the controller 330 determines portions of the audio content for each transducer based on the operable frequency range of that transducer. For example, the controller 330 determines a portion of the audio content within a range of 100 Hz-300 Hz which may be the range of operation for a bone conduction transducer. The content signal may comprise a target waveform for vibrating of each of the transducers 310. A frequency response model describes the response of audio system 300 to inputs at certain frequencies and may indicate how an output is shifted in amplitude and phase based on the input. With the frequency response model, the controller 330 may adjust the content signal so as to account for the shifted output. Thus, the controller 330 may generate a content signal of the audio instructions with the audio content (e.g., target output) and the frequency response model (e.g., relationship of the input to the output). In one embodiment, the controller 330 may generate the content signal of the audio instructions by applying an inverse of the frequency response to the audio content.

The controller 330 receives feedback from the microphone assembly 320. The microphone assembly 320 provides information about the detected acoustic pressure waves produced by one or more of the transducers 310. The controller 330 may compare the detected acoustic pressure waves with a target waveform based on audio content to be provided to the user. The controller 330 can then compute an inverse function to apply to the detected acoustic pressure waves such that the detected acoustic pressure waves match the target waveform. Thus, the controller 330 can update the frequency response model of the audio system using the computed inverse function specific to each user. The adjustment of the frequency model may be performed while the user is listening to audio content. The adjustment of the frequency model may also be conducted during a calibration of the audio system 300 for a user. The controller 330 can then generate updated audio instructions using the adjusted frequency response model. By updating audio instructions based on feedback from the microphone assembly 320, the controller 330 can better provide a similar audio experience across different users of the audio system 300.

In some embodiments of the audio system 300 with any combination of a cartilage conduction transducer, an air conduction transducer, and a bone conduction transducer, the controller 330 updates the audio instructions so as to affect varying changes of operation to each of the transducers 310. As each auricle of a user is different (e.g., shape and size), the frequency response model will vary from user to user. By adjusting the frequency response model for each user based on audio feedback captured by the microphone assembly 320, the audio system can maintain the same type of produced sound (e.g., neutral listening) regardless of the user. Neutral listening is having similar listening experience across different users. In other words, the listening experience is impartial or neutral to the user (e.g., does not change from user to user).

In another embodiment, the audio system uses a flat spectrum broadband signal to generate the adjusted frequency response model. For example, the controller 330 provides audio instructions to the transducers 310 based on a flat spectrum broadband signal. The microphone assembly 320 detects acoustic pressure waves at the entrance of user's ear. The controller 330 compares the detected acoustic pressure waves with the target waveform based on the flat spectrum broadband signal and adjusts the frequency model of the audio system accordingly. In this embodiment, the flat spectrum broadband signal may be used while performing calibration of the audio system for a particular user. Thus, the audio system may perform an initial calibration for a user instead of continuously monitoring the audio system. In this embodiment, the microphone assembly 320 may be temporarily coupled to the audio system 300 for calibration of the user. For example, after calibration, the optical sensing pathway 235 or 285 can be removed from the eyewear device to improve comfort to the user.

In some embodiments, the controller 330 manages calibration of the audio system 300. The controller 330 generates calibration instructions for each of the transducers 310. Calibration instructions may instruct one or more transducers to generate an acoustic pressure wave that corresponds to a target waveform. In some embodiments, the acoustic pressure wave may correspond to, e.g., a tone or a set of tones. In other embodiments, the acoustic pressure wave may correspond to audio content (e.g., music) that is being presented to the user. The controller 330 may send the calibration instructions to the transducers 310 one at a time or multiple at a time. As a transducer receives the calibration content, the transducer generates acoustic pressure waves in accordance with the calibration instructions. The microphone assembly 320 detects the acoustic pressure waves and sends the detected acoustic pressure waves to the controller 330. The controller 330 compares the detected acoustic pressure waves to the target waveform. The controller 330 can then modify the calibration instructions such that the transducers 310 emit an acoustic pressure wave that is closer to the target waveform. The controller 330 can repeat this process in until the difference between the target waveform and the detected acoustic pressure waves is within some threshold value. In one embodiment where each transducer is calibrated individually, the controller 330 compares the calibration content sent to the transducer against the detected acoustic pressure waves by the microphone assembly 320. The controller 330 may generate a frequency response model based on the calibration for that transducer assembly. Responsive to completing calibration of the user, the microphone assembly 320 may be uncoupled from the audio system 300. Advantages of removing the microphone assembly 320 include making the audio system 300 easier to wear, reducing volume and weight of the audio system 300 and potentially an eyewear device (e.g., eyewear device 100, eyewear device 200, or eyewear device 250) of which the audio system 300 is a component, and reducing power consumption of the audio system 300.

Figure 4:
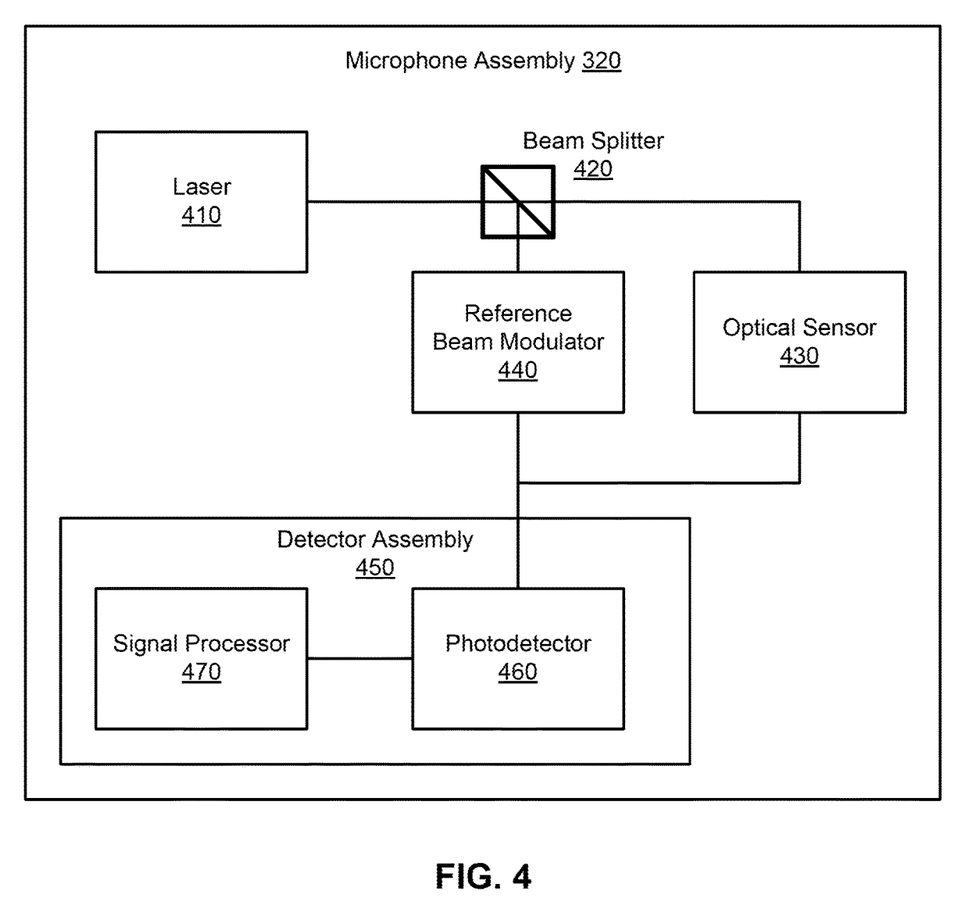
FIG. 4 is a block diagram of a microphone assembly of the audio system, in accordance with one or more embodiments.

FIG. 4 is a block diagram of a microphone assembly 320 of the audio system, in accordance with one or more embodiments. The microphone assembly 320 shown in FIG. 4 is an optical Mach-Zehnder interferometer that includes a laser 410 for generating a beam of light, a beam splitter 420 for splitting the beam into a reference beam and a sensing beam, an optical sensor 430 through which the sensing beam passes, a reference beam modulator 440 through which the reference beam passes, and a detector assembly 450 for measuring the sensed acoustic pressure wave based on the sensing beam and the reference beam.

The laser 410 emits a beam of light. The laser 410 may be any coherent light source, such as a laser diode. The laser 410 is coupled into a beam splitter 420. The beam splitter 420 is a device configured to separate the light beam emitted by the laser 410 into a first beam of light and a second beam of light. For example, the beam splitter 420 may be a half-silvered mirror, a pair of glass prisms, or a dichroic mirrored prism. The first beam is a sensing beam used to detect an acoustic pressure wave, and the second beam is a reference beam that is used to detect changes in the sensing beam.

The first beam (i.e., the sensing beam) is coupled into an optical sensor 430. The optical sensor 430 includes an optical sensing pathway through which the sensing beam travels. In some embodiments, the optical sensing pathway is configured to move with a detected acoustic pressure wave so that the sensing beam can sense the acoustic pressure wave. For example, the optical sensor 430 may be an optical fiber with a Fabry-Perot interferometer as described with respect to FIG. 2A, or an optical fiber coupled to a flexible membrane, as described with respect to FIG. 2B.

A detected acoustic pressure wave interacts with the optical sensor 430 to alter an optical path length of the sensing beam. Optical path length is the product of the geometric length of the path that the sensing beam travels and the index of refraction of the material through which the sensing beam travels (e.g., the index of refraction of the optical fiber, or the index of refraction of the cavity between the mirrors in a Fabry-Perot interferometer). The detected acoustic pressure wave creates particle displacements in a transmission medium through which the acoustic pressure wave travels. For an airborne wave detected by an optical sensing pathway suspended in air and positioned at an entrance to the user's ear, such as the optical sensing pathways shown in FIGS. 2A and 2B, the transmission medium is air. For a tissue borne pressure wave detected by an optical sensing pathway coupled to tissue of the user's head (e.g., in the vicinity of the bone conduction transducer shown in FIGS. 2A and 2B), the transmission medium is tissue, such as bone or cartilage. In either case, the particle displacements created by the acoustic pressure wave vibrate the optical sensing pathway (e.g., the membrane or the Fabry-Perot interferometer), and this vibration alters the geometric path length of the sensing beam through the optical sensing pathway, and thus alters the optical path length. Measuring changes to the optical path length provides a measurement of the particle displacements, which corresponds to a measurement of acoustic pressure.

The second beam (i.e., the reference beam) is coupled to a reference beam modulator 440. The microphone assembly 320 compares the sensing beam to the reference beam to measure the change to the optical path length of the sensing beam caused by the acoustic pressure wave. The reference beam modulator 440 modulates a parameter of the reference beam so that the detector assembly 450 can identify the reference beam based on the modified parameter and distinguish the reference beam from the sensing beam. For example, the reference beam modulator 440 can modulate the amplitude or frequency of the reference beam.

The modulated reference beam output by the reference beam modulator 440 and the sensing beam output by the optical sensor 430 are coupled into a detector assembly 450. In some embodiments, the modulated reference beam and the sensing beam are recombined prior to entering the detector assembly 450, as shown in FIG. 4. For example, the reference beam and the sensing beam output by the reference beam modulator 440 and the optical sensor 430, respectively, may enter a second beam splitter that outputs a combined reference beam and sensing beam. The change to the optical path length is observed in a change in the phase of the sensing beam after passing through the optical sensor 430. The change in phase of the sensing beam can be determined by comparing the phase of the sensing beam to the phase of the reference beam.

In the example shown in FIG. 4, the detector assembly 450 includes a photodetector 460 and a signal processor 470. The combined modulated reference beam and the sensing beam are coupled into the photodetector 460. The photodetector 460 is a device that receives light and converts the light into an electrical current. The combination of the reference beam and sensing beam yields constructive interference, and the amount of light detected at the photodetector 460 is related to the relative phases of the reference beam and the sensing beam. The signal processor 470 receives the current generated by the photodetector 460 and converts the current into a measurement of the detected acoustic pressure wave. In particular, the signal processor 470 determines changes in the optical path length of the sensing beam relative to the reference beam based on the relative phases of the sensing beam and the reference beam, and determines a measurement of the acoustic pressure wave based on the changes in optical path length. The signal processor 470 transmits the measurement of the acoustic pressure wave to the controller 330, which adjusts an audio instruction for one or more of the transducers 310 based on the measurement, as discussed above.

The signal processor 470 may also distinguish between changes to optical path length caused by acoustic pressure waves and changes to optical path length due to other factors. For example, if the audio system 300 is worn by a user in motion, motion of the user's head may cause changes to the optical path length, e.g., due to motion of the optical fiber. As an example, the signal processor 470 processes the received signal to identify frequencies of detected changes to optical path length, and selects portions of the signal in a range of frequencies that corresponds to acoustic pressure waves (e.g., 20 Hz-20 kHz). Changes to optical path length caused by physical motion are typically lower frequency, so the signal processor 470 can remove the portion of the received signal caused by physical motion as noise. In some embodiments, the controller 330 instructs a transducer 310 to produce acoustic pressure waves at a particular frequency, set of frequencies, or range of frequencies, and transmits this frequency information to the signal processor 470. In such embodiments, the signal processor 470 measures the portion of the received signal that matches the frequencies of the produced acoustic pressure waves.

While FIG. 4 shows an optical microphone assembly 320 based on a Mach-Zehnder interferometer, in other embodiments, alternate detection devices can be used. For example, the optical microphone assembly may be based on a Michelson interferometer, a Fizeau interferometer, or another type of optical interferometer or optical detection apparatus.

Figure 5:
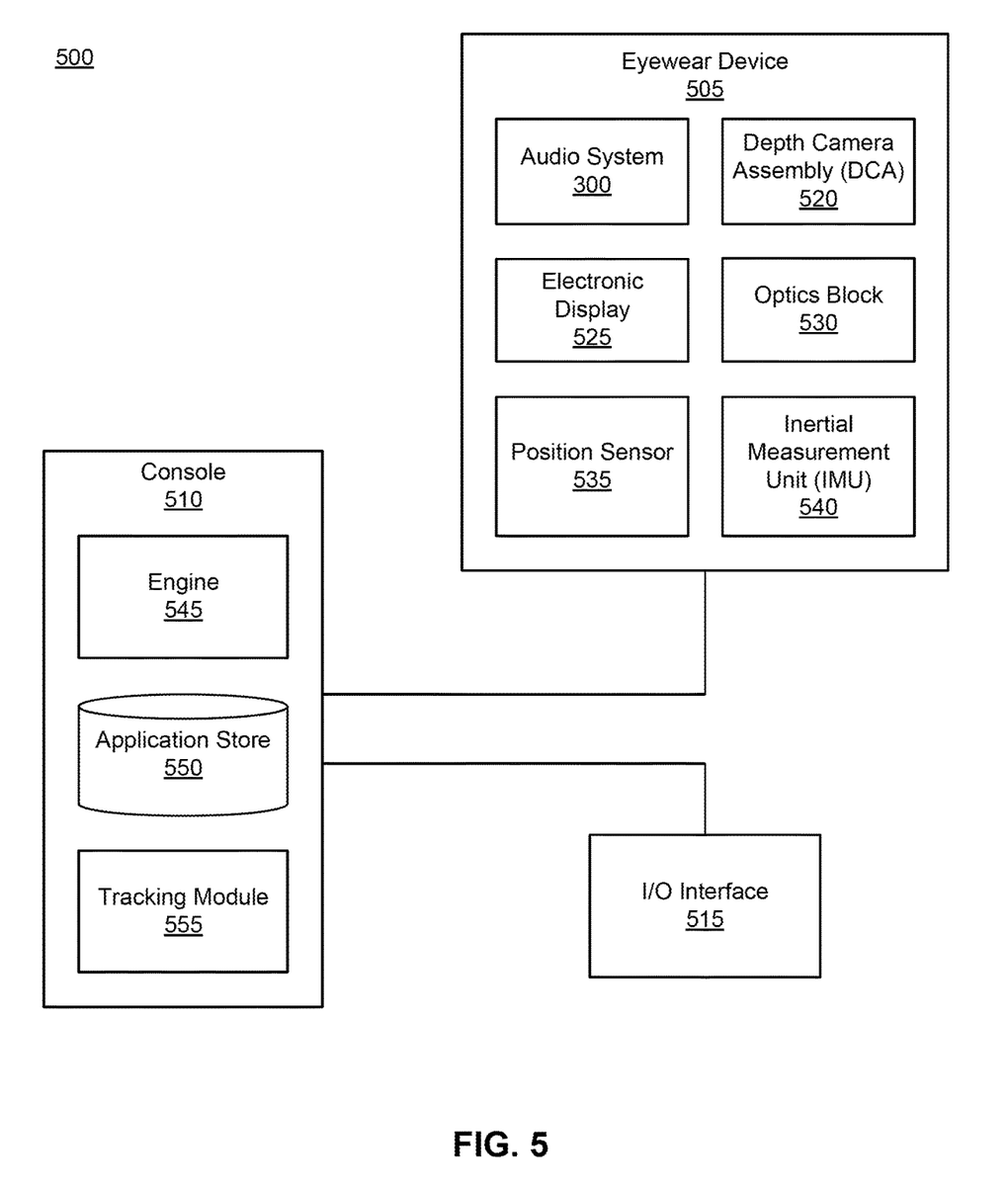
FIG. 5 is a system environment of an eyewear device including an audio system, in accordance with one or more embodiments.

FIG. 5 is a system environment 500 of an eyewear device including an audio system, in accordance with one or more embodiments. The system 500 may operate in an artificial reality environment, e.g., a virtual reality, an augmented reality, a mixed reality environment, or some combination thereof. The system 500 shown by FIG. 5 comprises an eyewear device 505 and an input/output (I/O) interface 515 that is coupled to a console 510. The eyewear device 505 may be an embodiment of the eyewear device 100. While FIG. 5 shows an example system 500 including one eyewear device 505 and one I/O interface 515, in other embodiments, any number of these components may be included in the system 500. For example, there may be multiple eyewear devices 505 each having an associated I/O interface 515 with each eyewear device 505 and I/O interface 515 communicating with the console 510. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments. For example, some or all of the functionality of the console 510 is provided by the eyewear device 505.

The eyewear device 505 may be a HMD that presents content to a user comprising augmented views of a physical, real-world environment with computer-generated elements (e.g., two dimensional (2D) or three dimensional (3D) images, 2D or 3D video, sound, etc.). In some embodiments, the presented content includes audio that is presented via an audio system 300 that receives audio information from the eyewear device 505, the console 510, or both, and presents audio data based on the audio information. In some embodiments, the eyewear device 505 presents virtual content to the user that is based in part on a real environment surrounding the user. For example, virtual content may be presented to a user of the eyewear device. The user physically may be in a room, and virtual walls and a virtual floor of the room are rendered as part of the virtual content.

The eyewear device 505 includes the audio system 300 of FIG. 3. The audio system 300 includes one or more sound conduction methods and an optical microphone assembly for detecting the produced sound. As mentioned above, the audio system 300 may include any combination of one or more cartilage conduction transducers, one or more air conduction transducers, and one or more bone conduction transducers. The audio system 300 provides audio content to the user of the eyewear device 505. The audio system 300 uses the optical microphone to monitor the produced sound so that it can compensate for a frequency response model for each ear of the user and can maintain consistency with produced sound across different individuals using the eyewear device 505.

The eyewear device 505 may include a depth camera assembly (DCA) 520, an electronic display 525, an optics block 530, one or more position sensors 535, and an inertial measurement Unit (IMU) 540. The electronic display 525 and the optics block 530 is one embodiment of a lens 110. The position sensors 535 and the IMU 540 is one embodiment of sensor device 115. Some embodiments of the eyewear device 505 have different components than those described in conjunction with FIG. 5. Additionally, the functionality provided by various components described in conjunction with FIG. 5 may be differently distributed among the components of the eyewear device 505 in other embodiments, or be captured in separate assemblies remote from the eyewear device 505.

The DCA 520 captures data describing depth information of a local area surrounding some or all of the eyewear device 505. The DCA 520 may include a light generator, an imaging device, and a DCA controller that may be coupled to both the light generator and the imaging device. The light generator illuminates a local area with illumination light, e.g., in accordance with emission instructions generated by the DCA controller. The DCA controller is configured to control, based on the emission instructions, operation of certain components of the light generator, e.g., to adjust an intensity and a pattern of the illumination light illuminating the local area. In some embodiments, the illumination light may include a structured light pattern, e.g., dot pattern, line pattern, etc. The imaging device captures one or more images of one or more objects in the local area illuminated with the illumination light. The DCA 520 can compute the depth information using the data captured by the imaging device or the DCA 520 can send this information to another device such as the console 510 that can determine the depth information using the data from the DCA 520.

The electronic display 525 displays 2D or 3D images to the user in accordance with data received from the console 510. In various embodiments, the electronic display 525 comprises a single electronic display or multiple electronic displays (e.g., a display for each eye of a user). Examples of the electronic display 525 include: a liquid crystal display (LCD), an organic light emitting diode (OLED) display, an active-matrix organic light-emitting diode display (AMOLED), some other display, or some combination thereof. The electronic display 525 may be a waveguide display.

In some embodiments, the optics block 530 magnifies image light received from the electronic display 525, corrects optical errors associated with the image light, and presents the corrected image light to a user of the eyewear device 505. In various embodiments, the optics block 530 includes one or more optical elements. Example optical elements included in the optics block 530 include: a waveguide, an aperture, a Fresnel lens, a convex lens, a concave lens, a filter, a reflecting surface, or any other suitable optical element that affects image light. Moreover, the optics block 530 may include combinations of different optical elements. In some embodiments, one or more of the optical elements in the optics block 530 may have one or more coatings, such as partially reflective or anti-reflective coatings.

Magnification and focusing of the image light by the optics block 530 allows the electronic display 525 to be physically smaller, weigh less, and consume less power than larger displays. Additionally, magnification may increase the field of view of the content presented by the electronic display 525. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 530 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display 525 for display is predistorted, and the optics block 530 corrects the distortion when it receives image light from the electronic display 525 generated based on the content.

The IMU 540 is an electronic device that generates data indicating a position of the eyewear device 505 based on measurement signals received from one or more of the position sensors 535. A position sensor 535 generates one or more measurement signals in response to motion of the eyewear device 505. Examples of position sensors 535 include: one or more accelerometers, one or more gyroscopes, one or more magnetometers, another suitable type of sensor that detects motion, a type of sensor used for error correction of the IMU 540, or some combination thereof. The position sensors 535 may be located external to the IMU 540, internal to the IMU 540, or some combination thereof.

Based on the one or more measurement signals from one or more position sensors 535, the IMU 540 generates data indicating an estimated current position of the eyewear device 505 relative to an initial position of the eyewear device 505. For example, the position sensors 535 include multiple accelerometers to measure translational motion (forward/back, up/down, left/right) and multiple gyroscopes to measure rotational motion (e.g., pitch, yaw, and roll). In some embodiments, the IMU 540 rapidly samples the measurement signals and calculates the estimated current position of the eyewear device 505 from the sampled data. For example, the IMU 540 integrates the measurement signals received from the accelerometers over time to estimate a velocity vector and integrates the velocity vector over time to determine an estimated current position of a reference point on the eyewear device 505. Alternatively, the IMU 540 provides the sampled measurement signals to the console 510, which interprets the data to reduce error. The reference point is a point that may be used to describe the position of the eyewear device 505. The reference point may generally be defined as a point in space or a position related to the eyewear device's 505 orientation and position.

The I/O interface 515 is a device that allows a user to send action requests and receive responses from the console 510. An action request is a request to perform a particular action. For example, an action request may be an instruction to start or end capture of image or video data, or an instruction to perform a particular action within an application. The I/O interface 515 may include one or more input devices. Example input devices include: a keyboard, a mouse, a game controller, or any other suitable device for receiving action requests and communicating the action requests to the console 510. An action request received by the I/O interface 515 is communicated to the console 510, which performs an action corresponding to the action request. In some embodiments, the I/O interface 515 includes an IMU 540, as further described above, that captures calibration data indicating an estimated position of the I/O interface 515 relative to an initial position of the I/O interface 515. In some embodiments, the I/O interface 515 may provide haptic feedback to the user in accordance with instructions received from the console 510. For example, haptic feedback is provided when an action request is received, or the console 510 communicates instructions to the I/O interface 515 causing the I/O interface 515 to generate haptic feedback when the console 510 performs an action.

The console 510 provides content to the eyewear device 505 for processing in accordance with information received from one or more of: the eyewear device 505 and the I/O interface 515. In the example shown in FIG. 5, the console 510 includes an application store 550, a tracking module 555 and an engine 545. Some embodiments of the console 510 have different modules or components than those described in conjunction with FIG. 5. Similarly, the functions further described below may be distributed among components of the console 510 in a different manner than described in conjunction with FIG. 5.

The application store 550 stores one or more applications for execution by the console 510. An application is a group of instructions, that when executed by a processor, generates content for presentation to the user. Content generated by an application may be in response to inputs received from the user via movement of the eyewear device 505 or the I/O interface 515. Examples of applications include: gaming applications, conferencing applications, video playback applications, or other suitable applications.

The tracking module 555 calibrates the system environment 500 using one or more calibration parameters and may adjust one or more calibration parameters to reduce error in determination of the position of the eyewear device 505 or of the I/O interface 515. Calibration performed by the tracking module 555 also accounts for information received from the IMU 540 in the eyewear device 505 and/or an IMU 540 included in the I/O interface 515. Additionally, if tracking of the eyewear device 505 is lost, the tracking module 555 may re-calibrate some or all of the system environment 500.

The tracking module 555 tracks movements of the eyewear device 505 or of the I/O interface 515 using information from the one or more position sensors 535, the IMU 540, the DCA 520, or some combination thereof. For example, the tracking module 555 determines a position of a reference point of the eyewear device 505 in a mapping of a local area based on information from the eyewear device 505. The tracking module 555 may also determine positions of the reference point of the eyewear device 505 or a reference point of the I/O interface 515 using data indicating a position of the eyewear device 505 from the IMU 540 or using data indicating a position of the I/O interface 515 from an IMU 540 included in the I/O interface 515, respectively. Additionally, in some embodiments, the tracking module 555 may use portions of data indicating a position or the eyewear device 505 from the IMU 540 to predict a future location of the eyewear device 505. The tracking module 555 provides the estimated or predicted future position of the eyewear device 505 or the I/O interface 515 to the engine 545.

The engine 545 also executes applications within the system environment 500 and receives position information, acceleration information, velocity information, predicted future positions, or some combination thereof, of the eyewear device 505 from the tracking module 555. Based on the received information, the engine 545 determines content to provide to the eyewear device 505 for presentation to the user. For example, if the received information indicates that the user has looked to the left, the engine 545 generates content for the eyewear device 505 that mirrors the user's movement in a virtual environment or in an environment augmenting the local area with additional content. Additionally, the engine 545 performs an action within an application executing on the console 510 in response to an action request received from the I/O interface 515 and provides feedback to the user that the action was performed. The provided feedback may be visual or audible feedback via the eyewear device 505 or haptic feedback via the I/O interface 515.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An audio system comprising:
  a transducer assembly configured to be coupled to an ear of a user and to produce an acoustic pressure wave based on an audio instruction;
  an optical fiber that is suspended in air such that an end of the optical fiber is proximate to an entrance of an ear canal of the ear, and a portion of the optical fiber is configured to move, at least in part, with the acoustic pressure wave;
  a laser configured to emit light that is separated into a reference beam and a sensing beam, and the sensing beam is coupled into the optical fiber, wherein movement of the optical fiber caused by the acoustic pressure wave interacts with the sensing beam in the optical fiber to alter an optical path length of the sensing beam;
  a detector assembly configured to:
    detect the reference beam and detect the sensing beam from the optical fiber, and
    measure the acoustic pressure wave based in part on changes in the optical path length between the reference beam and the sensing beam; and
  a controller configured to adjust the audio instruction based on the measurement of the acoustic pressure wave.

2. The audio system of claim 1, further comprising a beam splitter configured to separate the light emitted from the laser into the reference beam and the sensing beam.

3. The audio system of claim 1, further comprising a reference beam modulator configured to modulate a parameter of the reference beam, wherein the detector assembly is configured to identify the reference beam based on the modulated parameter.

4. The audio system of claim 1, wherein the optical fiber is suspended from a housing of the audio system.

5. The audio system of claim 1, wherein the end of the optical fiber couples to a flexible membrane that is configured to move with the acoustic pressure wave.

6. The audio system of claim 1, wherein the optical fiber is configured to be coupled to tissue of the user.

7. The audio system of claim 1, wherein the transducer assembly comprises at least one transducer configured to be coupled to a first portion of a back of an auricle of the ear of the user, wherein the at least one transducer is configured to vibrate the auricle over a first frequency range to cause the auricle to produce the acoustic pressure wave based on the audio instruction, and wherein the acoustic pressure wave with which the optical fiber is configured to move is in the first frequency range.

8. The audio system of claim 7, wherein the transducer assembly further comprises a second transducer configured to vibrate over a second frequency range, wherein the second transducer produces a second range of acoustic pressure waves, and wherein the optical fiber is further configured to move with a acoustic pressure wave in the second frequency range.

9. The audio system of claim 8, wherein the first frequency range is different from the second frequency range.

10. The audio system of claim 1, wherein the audio system is a component of an eyewear device.

11. An eyewear device comprising:
  a frame;
  an audio system coupled to the frame, the audio system comprising:
    a transducer assembly configured to be coupled to an ear of a user and to produce an acoustic pressure wave based on an audio instruction,
    an optical fiber that is suspended in air such that an end of the optical fiber is proximate to an entrance of an ear canal of the ear, and a portion of the optical fiber is configured to move, at least in part, with the acoustic pressure wave;
    a laser configured to emit light that is separated into a reference beam and a sensing beam, and the sensing beam is coupled into the optical fiber, wherein movement of the optical fiber caused by the acoustic pressure wave interacts with the sensing beam in the optical fiber to alter an optical path length of the sensing beam,
    a detector assembly configured to:
      detect the reference beam and detect the sensing beam from the optical fiber, and
      measure the acoustic pressure wave based in part on changes in the optical path length between the reference beam and the sensing beam; and a controller configured to adjust the audio instruction based on the measurement of the acoustic pressure wave.

12. The eyewear device of claim 11, further comprising a beam splitter configured to separate the light emitted from the laser into the reference beam and the sensing beam.

13. The eyewear device of claim 11, further comprising a reference beam modulator configured to modulate a parameter of the reference beam, wherein the detector assembly is configured to identify the reference beam based on the modulated parameter.

14. The eyewear device of claim 11, wherein the optical fiber is suspended from the frame.

15. The eyewear device of claim 11, wherein the end of the optical fiber is coupled to a flexible membrane configured to move with the acoustic pressure wave.

16. The eyewear device of claim 11, wherein the optical fiber is configured to be coupled to tissue of the user.

17. The eyewear device of claim 11, wherein the transducer assembly comprises at least one transducer configured to be coupled to a first portion of a back of an auricle of the ear of the user, wherein the at least one transducer is configured to vibrate the auricle over a first frequency range to cause the auricle to produce the acoustic pressure wave based on the audio instruction, and wherein the acoustic pressure wave with which the optical fiber is configured to move is in the first frequency range.

18. The eyewear device of claim 17, wherein the transducer assembly further comprises a second transducer configured to vibrate over a second frequency range, wherein the second transducer produces a second range of acoustic pressure waves, and wherein the optical fiber is further configured to move with a acoustic pressure wave in the second frequency range.

* * * * *